Figure 1:
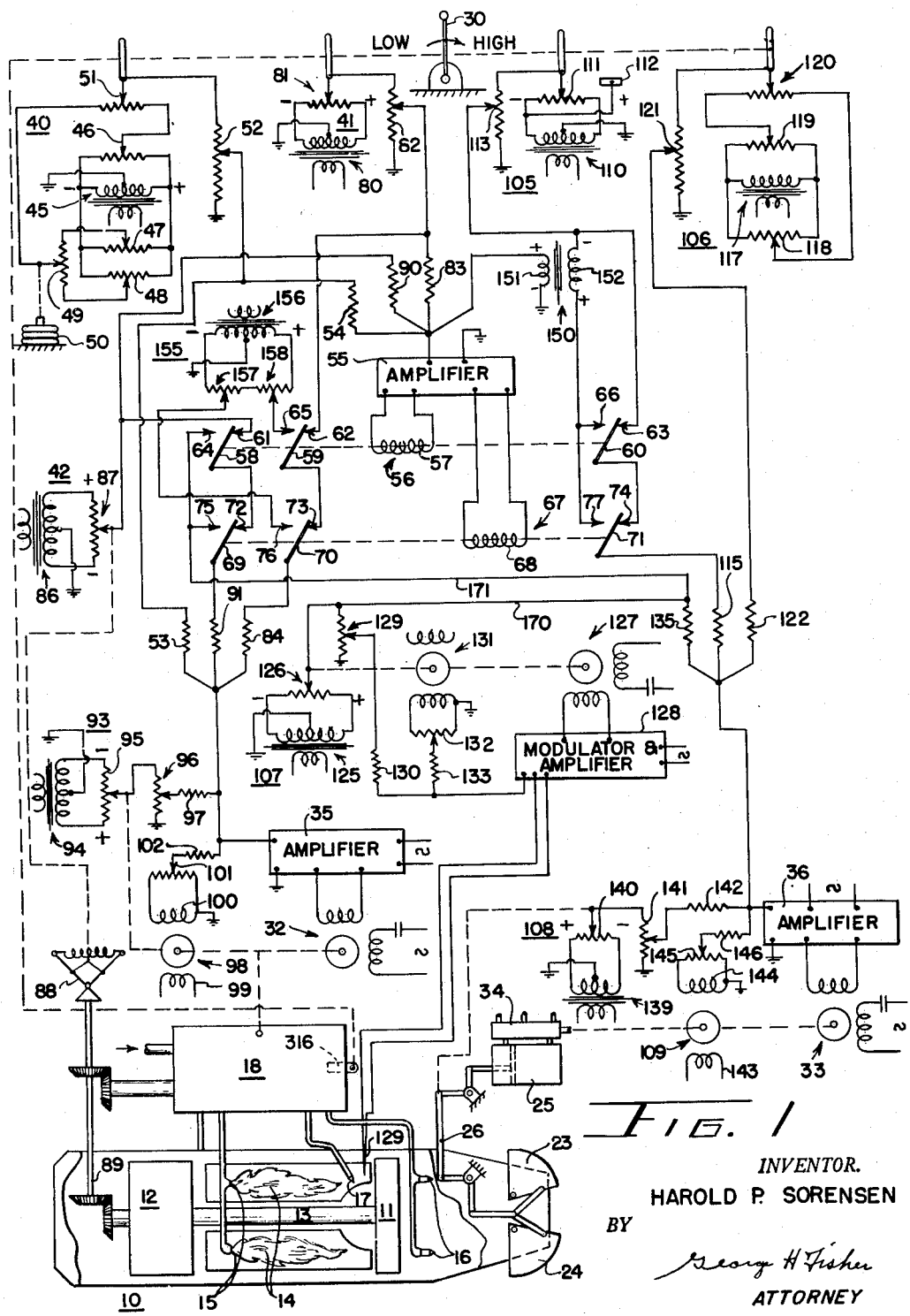

INVENTOR.
HAROLD P. SORENSEN
BY
George H Fisher
ATTORNEY

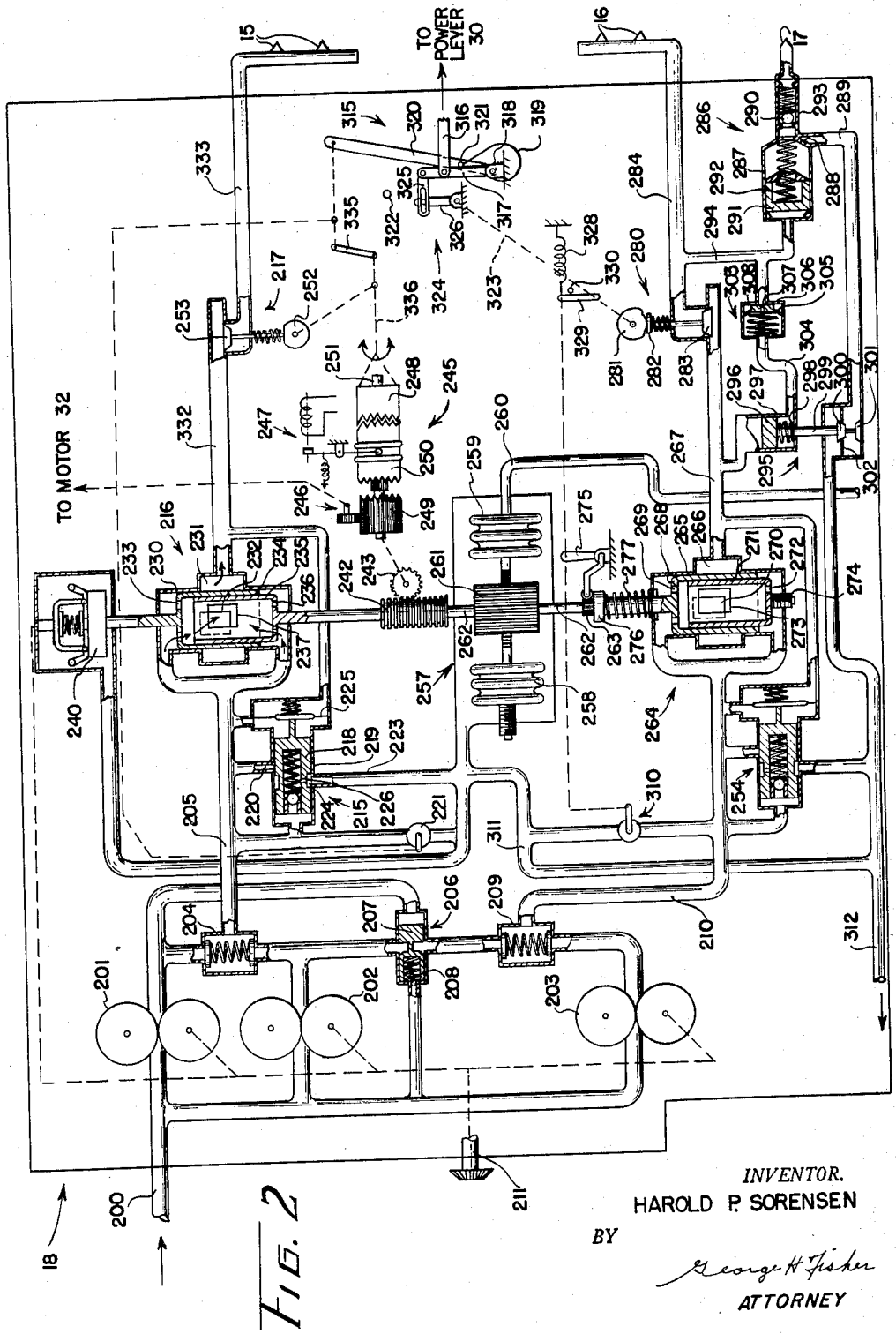

United States Patent Office 2,953,899
Patented Sept. 27, 1960

2,953,899

FUEL FLOW CONTROLLER FOR GAS TURBINES AND JET PROPULSION UNITS

Harold P. Sorensen, Minneapolis, Minn., assignor to Minneapolis-Honeywell Regulator Company, Minneapolis, Minn., a corporation of Delaware Filed May 17, 1951, Ser. No. 226,841

17 Claims. (Cl. 60—35.6)

The present invention is concerned with an improved type of control apparatus controlling the fuel flow for a combustion engine which may be of the gas turbine or jet type. More particularly, the present invention is concerned with a fuel flow controller which is adapted to cooperate with an electrical type of control system for providing means for controlling the fuel flow to the combustion engine and coordinating that fuel flow in accordance with electrical signals developed in a control network or in accordance with manual adjustments made directly upon the controller.

In a copending application of Eduard C. Petry et al. Serial No. 174,022, filed July 15, 1950, there is disclosed an electrical-mechanical system for controlling the operation of a combustion engine of the jet type. The present invention is arranged to cooperate with an electrical system of the type shown in said copending application to control the fuel flow and provide for controlling the operation of the fuel flow in the event that the main electrical control system should fail.

In providing a fuel flow controller for an engine having a main combustion chamber and an after-burner chamber, it has been found necessary to coordinate the flow of fuel to the two chambers, when the control is being adjusted directly by a manual controller. When the electrical control system is off, there are two main control parameters readily checked for controlling the engine operation; these are compressor discharge pressure and engine speed. By utilizing the compressor discharge pressure as the main control parameter the operator will know that the adjustment of the power lever will produce a fuel flow which is within the limits of the engine. By synchronizing after-burner fuel flow and the main burner fuel flow with a single controller, the dangers of dissimilar aging characteristics and calibration shifting present when multiple controllers are used is eliminated. The supplying of fuel to an engine of the type with which the present controller is adapted to be used is by means of constant displacement pumps. It has also been found essential to provide an emergency pump which is capable of supplying fuel to either of the fuel channels flowing to the main and after burners in the event that the normal pumps should fail. In order to prolong the life of all of the pumps used and to not waste driving energy, the fuel pumping load, under normal operating conditions, is divided between the fuel pumps. In the event of failure of one of the pumps, the emergency pump is arranged to supply fuel to the channel associated with the failing pump. In the control of combustion engines of the present types, in addition to providing a coordinator for the fuel flow, it is necessary to provide for igniting the after-burner when it is brought into operation. Because of the weight requirements of the aircraft installation and the need for simplicity, it has been found desirable to utilize existing pressures in the fuel system for operating the igniter automatically without the addition of external controls when there is a call for operation of the after-burner. In the interests of simplicity, compactness, and weight, all of the above features should be combined in a single unit.

It is therefore an object of the present invention to provide a new and improved fuel controller for a combustion engine having main and after-burner chambers.

A further object of the present invention is to provide in a fuel controller for a combustion engine having a main fuel flow passage and an afterburner fuel flow passage, a pair of flow control valves which are simultaneously adjusted by a single controller which responds to an engine operating variable.

A still further object of the present invention is to provide in a controller for a combustion engine having a main fuel flow passage and an afterburner fuel flow passage, a pair of flow control valves which are simultaneously adjusted by a single controller responding to an engine operating variable and a plurality of other controllers responding to further engine operating variables adjusting only one of said valves.

Another object of the present invention is to provide a fuel pumping system for a combustion engine having two fuel flow passages where two fuel pumps normally supply fuel to the respective passages and a third pump is provided for supplying fuel to either of said passages if one of said two pumps should fail.

Another object of the present invention is to provide a fuel pumping system for a combustion engine having a main fuel flow passage and an afterburner fuel flow passage with a fuel pump in each of said passages and a third pump to supply fuel to said main passage if the pumps in said main and afterburner passages should fail.

Still another object of the present invention is to provide a fuel igniter for a combustion chamber of an engine wherein an igniter is operated by fuel pressures in a fuel flow channel to the chamber.

These and other objects of the present invention will be understood upon considering the following specification and the drawings of which:

Figure 1 represents schematically how a complete combustion control system may appear when cooperating with a jet-type engine having an afterburner; and Figure 2 shows diagrammatically the fuel flow controller of the present invention.

Referring to Figure 1, the numeral 10 represents the gas turbine engine of the jet type. This engine comprises a turbine 11 which is effective to drive a compressor 12 by means of an interconnecting shaft 13. The driving for the turbine 11 originates from heated gases present in the combustion chamber 14 as the gases expand through the turbine 11. Fuel for the combustion chamber 14 is supplied thereto by a plurality of nozzles 15. Immediately back of or downstream of the turbine 11 is an afterburner chamber with fuel supplied by a plurality of nozzles 16. Immediately upstream of the turbine 11 in the end of the combustion chambers 14 is an injector nozzle 17 which is arranged to supply fuel for igniting the after burner when the fuel is emitted from the nozzle 16. For controlling the flow of fuel to the nozzles 15, 16 and 17 there is a fuel controller 18, toward which the present invention is directed, and which is shown in greater detail in Figure 2.

The outlet nozzle area of the engine 10 may be variably controlled by a pair of "eyelids" or shutters 23 and 24 which may be variably positioned by a hydraulic servomotor 25 acting through a suitable linkage and toggle arrangement 26.

For coordinating the positioning of the fuel regulating device 18 and the eyelids 23 and 24, a power lever 30 has been provided. This power lever is arranged to select the desired setting for engine speed which the present system will effect by causing the operation of motor 32 which is coupled to the fuel regulator 18. The power selector 30 is also effective to control a temperature control motor 33 which operates to position a pilot valve 34 associated with the hydraulic servomotor 25.

The control signals for the speed control motor 32 and the temperature control motor 33 are derived from a plurality of alternating current electrical networks each of which has an alternating current output signal which is fed through suitable summing resistors into the input of an amplifier where the signals are compared in phase and amplitude, are amplified, and are used to reversibly control a two-phase reversible motor connected to the output of the amplifier. The amplifier motor combination may be of either type disclosed in the A. P. Upton Patent 2,423,534, issued July 8, 1947. There are two main control channels in this apparatus, a speed control channel and a temperature control channel. The signals from the speed control channel are normally fed into an amplifier 35 which is arranged to reversibly drive the motor 32. The signals from the temperature control channel are normally fed into an amplifier 36 which is effective to reversibly drive the motor 33.

Considering first the speed control channel, it will be seen that this channel comprises a speed calibrating network 40, a speed selecting network 41, and a speed indicating network 42. The speed calibrating network 40 will be seen to comprise a transformer 45 having a tapped secondary winding with its end terminals connected to the end terminals of a maximum speed calibration potentiometer 46, a high altitude idle bias potentiometer 47, and a low altitude idle speed bias potentiometer 48. The sliders of the potentiometers 47 and 48 are connected to the end terminals of an altitude bias fader potentiometer 49 whose slider is arranged to be positioned by an altitude responsive bellows 50. The slider of this altitude fader potentiometer is connected to one end of the resistor of fader potentiometer 51 positioned by speed selecting or power lever 30. The other end of the resistor of fader potentiometer 51 is connected to the slider of the maximum speed calibrating potentiometer 46. The output of the calibration network 40 is taken from the slider of the fader potentiometer 51 through a sensitivity potentiometer 52 and from there fed to the input of amplifier 35 through a suitable summing resistor 53. The control signals from the network 40 are also fed from the sensitivity potentiometer 52 through a suitable summing resistor 54 to the input of a transfer control amplifier 55.

This transfer control amplifier 55 may be of the type disclosed in the above mentioned Upton patent wherein the output of the amplifier is used to energize a pair of relays 56 and 67. One or the other of these relays will be energized depending upon the alternating current phasing of the signal applied to the input of the amplifier 55. The relay 56 comprises a relay winding 57 and a plurality of switch blades 58, 59 and 60 which are normally biased into engagement with contacts 61, 62 and 63, respectively. When the relay winding is energized, the switch blades 58, 59 and 60 will move into engagement with the switch contacts 64, 65 and 66, respectively. The relay 67 comprises a relay winding 68 and a plurality of switch blades 69, 70 and 71 which are normally biased to engagement with associated switch contacts 72, 73 and 74. When winding 68 is energized the switch blades 69, 70 and 71 are normally moved into engagement with associated contacts 75, 76 and 77.

The speed selecting network 41 comprises a transformer 80 having a center tapped secondary winding whose end terminals are connected to a speed selecting potentiometer 81. The output from the network is fed from the wiper of potentiometer 81 to a sensitivity potentiometer 82 and through a summing resistor 83 into the input of amplifier 55 and also through switch contact 62, switch blade 59, switch contact 73, switch blade 70, and summing resistor 84 into the input of amplifier 35.

The speed indicating network 42 comprises a transformer 86 having a center tapped secondary winding whose end terminals are connected to a speed indicating potentiometer 87. The slider of this potentiometer is arranged to be positioned by suitable speed indicating device indicated generally as 88, the latter of which is arranged to be driven by the engine 10 through gearing 89. The output from the network 42 is taken from the slider of the potentiometer 87 and is spread through a summing resistor 90 into the input of amplifier 55 and is also fed through switch contact 61, switch blade 58, switch contact 72, switch blade 69, and summing resistor 91 into the input of amplifier 35.

Another signal source for the amplifier 35 is derived from the follow-up network 93. This network comprises a transformer 94 having a center tapped secondary winding with the end terminals thereof connected to a follow-up potentiometer 95. The slider of this potentiometer 95 is arranged to be positioned by the motor 32 as it adjusts the regulation 18. The output from network 93 is fed from the slider potentiometer 95 through a sensitivity control potentiometer 96 and then through a summing resistor 97 into the input of amplifier 35.

A further signal source for the amplifier 35 is obtained from a velocity generator 98 which comprises a power winding 99 and an output winding 100. The output winding 100 is connected to the end terminals of a sensitivity potentiometer 101 and the slider of potentiometer 101 is connected through a summing resistor 102 to the input of amplifier 35. The rotor of the velocity generator is arranged to be driven by the motor 32 and this generator will have an output frequency which corresponds to the frequency of the power winding 99, an output voltage whose magnitude will be dependent upon the speed of operation of the motor 32 and an output phase which will be dependent upon the direction of rotation of the motor 32. The main purpose of the velocity generator in the present arrangement is for stabilization purposes in the control system to prevent hunting and overshooting of the control.

The control signals for the temperature control channel arise from the temperature selecting network 105, the temperature calibrating network 106, the temperature indicating network 107, follow-up network 108, and the velocity generator 109. As in the speed control channel, the signals from these various networks are all added by parallel addition through suitable summing resistors and the signals are applied to the input of the amplifier 36.

The temperature selecting network 105 comprises a transformer 110 having a tapped secondary winding whose end terminals are connected to the ends of a temperature selecting potentiometer 111. The slider of this potentiometer is arranged to be positoned by the power lever 30 and also serves as the output terminal for the network. A contacting segment 112 is provided for establishing a contact point for the slider of the potentiometer 111 which, when the slider is engaging the segment, will effectively connect the slider to the opposite end of the potentiometer 111. The output from the network 105 is fed through a sensitivity control potentiometer 113, through switch contact 63, switch blade 60, switch contact 74, switch blade 71, and summing resistor 115 and to the input of amplifier 36.

The calibration network 106 comprises a power transformer 117 having a secondary winding with a grounded center tap. The end terminals of the secondary winding are connected to the end terminals of a maximum operating temperature calibrating potentiometer 118 and a minimum operating temperature calibrating potentiometer 119. The sliders of the calibration potentiometer 118 and 119 are connected to the end terminals of a fader potentiometer 120 the slider of which is arranged to be positioned by the power lever 30. The output taken from the slider of potentiometer 120 is fed through a sensitivity control potentiometer 121 and a summing resistor 122 into the input of amplifier 36.

The temperature indicating network 107 comprises a power transformer 125 having a center tapped secondary winding whose end terminals are connected to the temperature indicating potentiometer 126. The slider of this potentiometer is arranged to be positioned by a motor 127. The motor 127 is arranged to be driven by the modulator and amplifier 128 which derives its main control signal from a temperature responsive element which may be a thermocouple 129, the latter of which is positioned on the upstream side of the turbine 11 of the engine 10. This modulator and amplifier 128 and the motor 127 may be of the type disclosed in the Jones Patent 2,306,479, issued December 29, 1942. The modulator-amplifier 128 derives the follow-up signal from the network 107 through a sensitivity potentiometer 129 and a summing resistor 130. An anti-hunting stabilizing signal is derived from a velocity generator 131 whose output is fed through a sensitivity potentiometer 132 and summing resistor 133 into the amplifier portion of the apparatus. The output from the temperature indicating potentiometer 126 is also fed through a summing resistor 135 into the input of amplifier 36.

The follow-up network 108 comprises a power transformer 139 having a center tapped secondary winding with the end terminals thereof connected to a potentiometer 140. The output from the follow-up potentiometer is fed through a sensitivity potentiometer 141 and through a summing resistor 142 to the input of amplifier 36.

The velocity generator 109 has an input winding 143 and an output winding 144, the latter of which is connected to the end terminals of a sensitivity potentiometer 145. The output of the potentiometer 145 is fed through a suitable summing resistor 146 to the input of amplifier 36.

Associated with the transfer portion of the apparatus is a transformer 150 which is used for signal reversing purposes and for isolating purposes. Transformer 150 comprises a primary winding 151 and a second 152.

A further calibration network 155 is provided for use when the control is in the transient state of operation. This network comprises a transformer 156 having a center tapped secondary winding with the end terminals thereof connected to a pair of series connected potentiometers 157 and 158. Potentiometer 157 is a blowout temperature calibrator and potentiometer 158 is a maximum temperature calibrator, these potentiometers being effective in the control system during transient operation as will be explained in the operational description that follows.

The power selecting lever 30, in addition to making adjustments in the electrical network of the control apparatus, is also connected by a suitable mechanical means to a control lever 160 which is positioned on the fuel regulator 18. Normally, when the electrical system is operating properly, the positioning of the lever 160 on the fuel regulator 18 will have no affect upon the control of the fuel flow through the regulator. However, upon the failure of the electrical system, control lever 160 will become effective, as will be explained in connection with Figure 2.

*Steady state operation of the electrical control system*

Considering the operation of the electrical portion of the apparatus during steady state conditions, it is assumed that the speed which had been selected by the power lever 30 will be the same as the speed indicated by the engine speed responsive device 88. As long as the selected speed and the engine speed are within predetermined limits of each other the apparatus will stay in the steady state mode of operation. During the steady state mode of operation, the transfer control amplifier 55 will not be effective to energize either of the relays 56 or 67 and these relays will be in the position in which they are shown upon the drawing. When the relays 56 and 67 are deenergized the speed control portion of the apparatus will be controlling the operation of the motor 32 and the temperature control portion of the apparatus will be controlling the motor 33. Assuming that each of the sliders of all of the networks are centered on their respective potentiometers, it will be seen that no electrical signals will appear on the sliders when measured between the sliders and the grounded center taps of the respective secondaries of the power transformers. With no signals arising from any of the networks, it will be seen that there will be no signal applied to the inputs of either amplifier 35 or 36 so that the motors 32 and 33 controlled by these amplifiers will remain in a fixed position.

Considering now the speed control channel, assume that there has been a decrease in engine speed. When there is a decrease in the engine speed it is necessary to increase the fuel flow to the combustion chambers 14. The decrease in engine speed will be indicated by the speed indicator 88 moving the slider of the potentiometer 87 in an upward direction. Assuming the phasing of the alternating current transformer 86 to be such that the upper terminal is positive and the lower terminal of the secondary is negative, for one particular half cycle, movement of the slider in an upward direction will result in a positive signal appearing upon the slider when measured with respect to the grounded center tap transformer 86. This positive signal will be fed from the slider of this potentiometer through the switch contact 61, switch blade 58, switch contact 72, switch blade 69, and summing resistor 91 into the input of amplifier 35. This signal will be effective to cause adjustment of the fuel regulating device 18 so that more fuel will flow to nozzles 15 of the main burner. As the motor 32 moves, the follow-up slider of the potentiometer 95 will also be moved. Assuming that the phasing of the transformer 94 to be such that the lower terminal of the potentiometer 95 is positive and the upper terminal thereof is negative, and with this slider moving in an upward direction, a negative voltage will appear on the slider when measured with respect to the ground and center tap of the transformer 94. This negative signal will be applied through the summing resistor 97 to the input of amplifier 35. The effect of the negative signal appearing on the input of amplifier 35 will be to cancel out the effect of the positive voltage arising from the speed indicating network 42 so that there will no longer be an effective input signal to amplifier 35 and will no longer drive the motor 32. Inasmuch as the adjustment of the fuel regulator 18 will have the effect of increasing the fuel flow to the chambers 14 of the main burner, there will be a resultant increase in the temperature of the gases within the chambers 14. This increase in temperature of the gases will result in the gases exerting a greater force upon the blades of the turbine 11 as they expand therethrough. With a greater force exerted upon the blades of turbine 11, there will be an increase in speed of the turbine and this increase in speed will be detected by device 88 which will in turn move the slider of the speed indicating potentiometer 87 back to the position where it was originally assumed to be. When the slider of this potentiometer 87 is moved back to this position there will be no output signal from the network 42 and the only signal remaining will be the negative signal from the balancing network 93. This rebalancing signal will be effective to cause the amplifier 35 to drive the motor 32 in the opposite direction to decrease the fuel flow and, neglecting any droop in the system, the system will be moved back to the position shown upon the drawing.

During the above explanation, no consideration was given to the operation of the velocity generator 98. The effect of this velocity generator 98 will be to feed an anti-hunting signal into the input of amplifier 35 through summing resistor 102. This anti-hunting signal is so phased that when the motor 32 is driving the velocity generator 98, and the rebalancing potentiometer 95, the output therefrom will be of the same polarity as the direction which the slider of the potentiometer 95 is being moved, and will have the effect of causing a premature balance of the signal on the input of amplifier 35. Thus, the motor 32 will not be effective to over-adjust the fuel regulator 18 and the system will have an opportunity to recover the desired speed before there is an over-adjustment.

If a small adjustment should be made of the power lever 30 with the adjustment being made in the increased power direction or toward the right, the slider of the speed selecting potentiometer 81 will be moved toward the right. This movement of the slider of the potentiometer 81 will result in a positive signal appearing on the slider when measured with respect to the grounded center tap of transformer 80. This positive voltage will be fed into the input of amplifier 35 through the sensitivity potentiometer 82, switch contact 62, switch blade 59, switch contact 73, switch blade 70, and summing resistor 84. This positive signal will be effective to cause the amplifier 35 to drive the motor 32 in a fuel increasing direction. As the motor 32 adjusts the fuel regulator 18 to increase the fuel flow, the rebalancing network 93 will also be adjusted and will tend to eliminate the signal from the network 41. As long as the fuel regulator 18 is being adjusted to increase fuel flow there will be a resultant increase in speed, which speed will be detected by the speed responsive means 88 and the increased speed will be effective to move the slider of potentiometer 87 in a downward direction so that the combined effects of the speed indicating network 42 and the rebalancing network 93 will tend to cancel out the speed selecting signal from the network 41. The system will thus be stabilized out at a newly selected speed.

Under the conditions assumed thus far there has been no signal arising from the calibration network 40 inasmuch as it has been assumed that the sliders of the potentiometers 46, 47 and 48 have all been centered on the respective resistors so that there has been no output signal on any of the sliders. Under normal conditions the control apparatus will be set up so that signals do appear from these potentiometers. In order to set the maximum speed calibration potentiometer 46 it is necessary that the power lever 30 be advanced to the maximum power position and when in that position slider of potentiometer 46 will be adjusted until the actual engine speed is the speed that is desired for that particular setting of the power lever. In calibrating the control when the power lever is in the idle position, it is necessary that the power lever 30 be moved in a counter clockwise direction to the idle position. It is also necessary to calibrate for ground idle speed and maximum altitude idle speed. The speed biasing calibration is accomplished by adjusting the slider potentiometer 48 when the bellows 50 is depressed to a point where the slider 49 is in the lower position of its associated resistor. For setting the maximum altitude idle speed bias the slider of potentiometer 49 is moved to the upper extreme position and the calibration adjustment is made by adjusting the slider of potentiometer 47. Inasmuch as the idle speed of the engine at various altitudes will vary with the different types of engines, it is possible with the present arrangement to have the idle speed increase or decrease with changes in altitude depending upon how the potentiometers 47 and 48 are adjusted. It will be obvious that when the bellows 50 is compressed at low altitudes, the slider 49 will be moved in a downward direction and the signals arising from the ground idle potentiometer 48 will be predominant. Further, as the altitude of the apparatus is increased, the bellows 50 will expand and will move the slider of the potentiometer 49 in an upward direction so that the ground idle potentiometer 48 will be faded out and the maximum altitude idle calibration potentiometer 47 will be faded in. It will be further noted that movement of the power lever 30 is effective to variably select the amount of calibration that is desired from the idle portion of the apparatus to the maximum speed portion. It will be obvious that when the power lever is in the maximum power position the slider of the fader potentiometer 51 will be in the right hand position and will be selecting the control signal from maximum speed calibrating potentiometer 46 and the altitude biasing signal will have a minimum effect upon the signal appearing upon the slider of the potentiometer 51. Thus, when the slider for the potentiometer 51 is moved in the idle position, the signals arising from the idle speed fader potentiometer 49 will be predominant and the signals from the potentiometer 46 will be at a minimum.

It will also be noted that the altitude control will have no effect upon the operation of the power lever 30 and the operator thereof will be able to have full movement of the power lever regardless of the adjustment of the altitude control. It will be obvious that the output signal from the calibration network 40, when fed through the summing resistor 53 to the input of amplifier 35 will have the same effect upon the amplifier as the other control signals arising from the speed selecting network 41 or the speed indicating network 42.

Considering now the temperature control channel as it is effective to regulate the positioning of the eyelids 23 and 24, assume that the sliders of the respective potentiometers are centered upon their respective resistors so that there will be no electrical signals appearing upon the sliders when measured with respect to the grounded center taps of the transformers. Under these conditions no electrical signals will be fed into the amplifier 36 and the motor 33 controlled thereby will remain stationary.

In the event that the temperature on the upstream side of the turbine as sensed by the thermocouple 129 should drop, it is desired that the eyelids 23 and 24 be moved in a closing direction to decrease the exhaust nozzle area of the engine 10. The drop in temperature of the thermocouple 129 will be detected by the modulator and amplifier 128 which will in turn be effective to drive the motor 127. Assuming the phasing of the temperature indicating network 107 to be such that for the particular half-cycle under consideration the left-hand terminal of the potentiometer resistor is negative and the right-hand terminal as positive, a decrease in temperature will result in the motor 127 moving the slider of the potentiometer 126 toward the right so that a positive signal will appear upon the slider when measured with respect to the grounded center tap of the transformer 125. This positive voltage will be fed through the summing resistor 135 into the input of amplifier 36 and the amplifier 36 will cause rotation of the motor 33 to effect an adjustment of the pilot valve 34. The pilot valve 34 will be effective to cause the hydraulic servomotor 25 to position the eyelids 23 and 24 through the toggle linkage 26 in a closing direction and will at the same time effect an adjustment of the slider of follow-up potentiometer 140. The movement of the slider of follow-up potentiometer 140 will be toward the right, and assuming the phasing to be set at the left-hand terminal of the potentiometer is positive and the right hand terminal is negative, this movement will cause a negative signal to appear upon the slider when measured with respect to the ground of center tap of transformer 139. This negative signal will be fed through the sensitivity potentiometer 141 and the summing resistor 142 to the input of amplifier 36 and will tend to cancel out the positive signal arising from the temperature indicating network 107. With the signals effectively cancelled out, the motor 33 will stop rotating and the servomotor 25 will come to rest.

The closing movement of the eyelids 23 and 24 will increase the backpressure on the turbine 11 and will increase the temperature of the gases on the upstream side of the turbine 11 so that the temperature of the thermocouple 129 will increase and will cause the modulator and amplifier 128 to reposition the motor 127 and the slider 126 back to its originally assumed position. With the slider of the potentiometer 126 repositioned to its originally assumed position, the signal from the rebalancing network 108 will be effective to apply to the input of the amplifier a predominantly negative signal which will cause the motor 33 to position the pilot valve 34 in the opposite direction so that the eyelids 23 and 24 will be opened by the hydraulic servomotor 25 back to their originally assumed position, neglecting any droop in the system and assuming the condition causing the temperature to drop is no longer present.

The effect of the velocity generator 109 will be the same as the generator 98 and it will tend to stabilize the operation of the system by preventing the system from overcorrecting when there has been a change.

If the power lever 30 should be moved in the increased power direction, then the slider of the potentiometer 111 will be moved toward the right. Assuming the phasing of the transformer 110 to be such that the left-hand terminal of the potentiometer resistor is negative and the right-hand terminal is positive, there will be a voltage appearing between the slider and grounded center tap of the transformer 110. This signal will be fed through the sensitivity potentiometer 111, switch contact 63, switch blade 60, switch contact 74, switch blade 71, and summing resistor 115 to the input of amplifier 36. This positive signal on the input of amplifier 36 will be effective to cause the motor 33 to rotate in a direction to effect closing of the eyelids 23 and 24. When the eyelids 23 and 24 move in a closing direction, the rebalancing potentiometer slider will be moved toward the right to tend to counteract the positive signal arising from the temperature selecting network 105 and, as the eyelids 23 and 24 close, the temperature of the engine will be increased and the modulator and amplifier 128 will cause the motor 127 to drive the slider potentiometer 126 toward the left. The negative signal from the temperature indicating network 107 and the negative signal from the rebalancing network 108 when combined with the positive signal from the selecting network 105 will cancel out the positive signal and the amplifier 36 will no longer be effective to position the motor 33 and the apparatus will stabilize out at a new position which will be effective to maintain the engine temperature at the newly selected value.

Considering now the temperature calibrating network 106, as assumed above, the sliders of the maximum temperature calibration potentiometer 118 and a minimum calibration potentiometer 119 were centered so that there were no electrical signals appearing upon the respective sliders. Normally, the control apparatus will be set up by moving the power lever 30 to one extreme position or the other. Assuming that the slider is first moved to the minimum power position, the slider of the fader potentiometer 120 will be moved to the left-hand of the associated resistor so that the slider will be effectively connected to the slider of the minimum temperature calibrating potentiometer 119. When in this position the minimum temperature will be set up by making an adjustment of the calibration potentiometer 119 until desired engine temperature is sensed. To calibrate for the maximum temperature, the power lever is moved to the maximum power position so that the slider of the potentiometer 120 is at the right-hand terminal of its associated resistor and the slider is effectively connected to the slider with a maximum temperature calibration potentiometer 118. In order to set the desired temperature within the maximum power position the potentiometer 118 will be similarly adjusted. It will be obvious that as the slider of the potentiometer 120 is moved between its two extreme positions, the calibrations from the potentiometers 118 and 119 will be variably selected. This will have the effect of maintaining the calibration within predetermined fixed limits at either end.

The consideration of the control apparatus thus has been concerned with the individual control channels. It will be quite obvious that there will be an interrelation between the two channels such that when the motor 32 operates and causes an increase in fuel flow to the engine to increase the engine speed there will also be a resultant increase in engine temperature and this increase in temperature will cause the motor 33 to tend to open the eyelids 23 and 24. However, the operation of the motor 33 will have little effect upon the eyelids because the time constant of the fuel control channel is designed to be considerably faster than the time constant of the temperature control channel which controls the eyelids 23 and 24. Thus, the fuel flow change necessary to correct an engine speed can be accomplished without there being any appreciable change in the eyelids 23 and 24. It will further be noted that when there is a decrease in engine temperature the motor 33 will be effective to close the eyelids 23 and 24 and this closing will result in a decrease in the pressure drop across the turbine 11 so that it will tend to decrease the engine's speed. This decrease in engine speed will tend to cause the motor 33 to increase the fuel flow and, of course, the engine temperature. While there is this cross relation between the two control channels due to the cross relation of the functions within the engine 10 it will be obvious that there will be no adverse effects due to this as long as the time constant of the eyelid control is longer than the time constant of the fuel valve control.

Since engine speed and temperature are the prime functions which determine the overall operation of the engine, there must be coordination between these two functions so that the power may be varied. This coordination is accomplished by the power lever 30 which operates upon potentiometers of networks 40, 41, 105 and 106 and may be arranged so that the engine speed and temperature will be selected according to the predetermined schedule determined by the particular engine to which the apparatus is attached.

In order to obtain military power in the present apparatus, it is necessary to advance the power control lever 30 in the increased power direction until such time as appropriate controls within the fuel controller 18 have been actuated and the fuel flow is initiated to the afterburner nozzle 16. This will be more fully explained in connection with Figure 2. When the afterburner is brought into operation, it is desired that the eyelids 23 and 24 be moved to the wide open position. This is accomplished by the movement of the power lever 30 to the extreme right-hand position when the slider associated with potentiometer 111 is moved into engagement with the contact segment 112. When the slider engages this segment the slider on the potentiometer will be effectively connected to the left-hand end of the secondary of transformer 110 which will mean that there will appear on the slider, when measured with respect to ground, a negative signal and this negative signal will be fed into the amplifier 36 to cause the same to drive the motor 33 and to cause the eyelids 23 and 24 to be moved to the wide open position. The apparatus will continue to operate producing military power until the power lever is moved to the left away from the military power position and when so moved the apparatus within the fuel controller 18 will cut off the afterburner fuel flow and the apparatus will assume the operatnig condition assumed above.

*Transient operation of the electrical system*

The conditions assumed above have been considered solely with respect to steady state operation where the selected engine speed and the actual engine speed have always remained substantially the same, or have not differed by more than a predetermined amount. If the selected engine speed is greater than the actual engine speed by more than a predetermined amount or is less than the actual engine speed by more than a predetermined amount, it is desired to change the control apparatus so that it will have a different mode of operation. This changing over of the mode of operation is to cause the engine speed to be changed to the selected or desired value as soon as possible.

The changing over or transfer is accomplished by the transfer control amplifier 55 and the transfer relays 56 and 67. The control signals for the amplifier 55 are derived from the speed selecting network 41, the speed calibrating network 40, and the speed indicating network 42. The control signal from the network 40 is fed through the sensitivity control 52 and summing resistor 90 into the input of amplifier 55 while the signal from the selecting network 41 is fed through the sensitivity potentiometer 82 and summing resistor 83 to the input of amplifier 55. The output of the speed indicating network 42 is fed through the summing resistor 90 into the input of amplifier 55. As long as the electrical signals arising from the calibrating network 40 and the selecting network 41 are balanced out by the electrical signals arising from network 42 the amplifier 55 will be ineffective to energize either relay 56 and 57.

If the power lever 30 should be advanced suddenly so that it is impossible for the speed responsive device 88 to follow the movement of the power lever, there will be a signal arising from the network 41 which will be in a positive direction and the magnitude of the signal will be greater than the magnitude of the signal arising from the network 42. With this more positive signal appearing upon the input of amplifier 55 the relay 56 will be energized and the switch blades 58, 59 and 60 will move into engagement with the associated contacts 64, 65 and 66 respectively. When this relay operates, the temperature indicating signal arising from network 107 is effectively connected in controlling relation to the amplifier 35 and the fuel control motor 32. The control signal from the network 107 may be traced from the slider of the potentiometer 126 through conductors 170 and 171, switch contact 64, switch blade 58, switch contact 72, switch blade 69, and summing resistor 91 into the input of amplifier 35.

A temperature selecting signal is also effectively connected into the input of amplifier 35, this selecting signal being in effect a maximum temperature calibrating signal which is taken from the potentiometer 158 of network 155. This potentiometer 158 is preset to select a temperature at which, during acceleration, the engine can safely operate with for a limited time.

The signal from potentiometer 158 is fed from the slider thereof through contact 65, switch 59, contact 73, switch blade 70, and summing resistor 84 into the input of amplifier 35. With the polarity of network 155 assumed, for one particular half cycle, to be negative on the left-hand terminal and positive on the right-hand terminal, the electrical signal appearing upon the slider of potentiometer 158 will be positive when measured with respect to the grounded center tap of the transformer 156. This positive signal when appearing upon the amplifier 35 will be calling for an increased fuel flow and the motor 32 will be driven to open the fuel regulator 18 to cause an increase in the fuel flow to the chambers 14. The fuel flow will continue to increase until such time as the thermocouple 129 indicates that the maximum acceleration temperature has been reached. When the maximum acceleration temperature has been reached, the motor 127 will have driven the slider 126 toward the left so that the electrical signal upon the slider of the potentiometer 126 will be sufficiently negative to overcome the positive signal arising from network 155 and the amplifier 35 will no longer supply power to drive the motor 32 in a fuel flow increasing direction.

With this increased amount of fuel flowing into the chambers 14 the gas temperature therein will increase and the turbine will increase its speed. This increase in speed will be detected by the speed responsive device 88 and the slider of the potentiometer 87 and the speed indicating network 42 will be moved in a downward direction so that a more negative signal will be appearing upon the output of this network. When this more negative signal is fed into the input of amplifier 55 and it is of sufficient magnitude to balance out the more positive signal arising from the network 41 due to the movement of the power lever 30, the amplifier 55 will no longer have an input signal. When the output relay 56 becomes deenergized the relay will return to the position in which it is shown on the drawing and the apparatus will continue under a steady state mode of operation with the engine speed in control of fuel flow rather than engine temperature.

Under the transient operation assumed above, no consideration was given to the eyelid control. When the acceleration realy 56 is energized it is desired that the eyelids 23 and 24 be moved in an opening direction. The effect of their moving in an open direction will be to increase the pressure drop across the turbine 11 and therefore to increase the speed of the turbine. In order that movement of the eyelids 23 and 24 be a controlled one, it has been found desirable to open the eyelids by an amount proportional to the speed error existing. In other words, it is desired to open the eyelids 23 and 24 by an amount proportional to the difference between the selected speed and the actual speed.

The speed differential signal is fed into the temperature control channel through the transformer 150. Under the conditions assumed above, the power lever 30 was moved into the advanced power position so that there was a predominately positive signal appearing upon the input of amplifier 55 and this positive signal is applied to the transformer winding 151 and is phased such that its upper terminal is positive with respect to the lower terminal. When the signal passes through the transformer to the secondary winding 152, the signal is reversed in polarity such that the upper terminal is negative and the lower terminal is positive. This signal will be added to signal arising from the temperature selecting network 105 and if the slider of the network 105 has been moved into the advanced power position a positive signal will appear upon the slider of potentiometer 111. This positive signal is counterbalanced by the negative signal appearing from the secondary of transformer 150 and these two signals are fed from the slider of potentiometer 111 through sensitivity potentiometer 113, secondary 152, switch contact 66, switch blade 60, switch contact 74, switch blade 71, and summing resistor 115 into the input of amplifier 36. If the negative signal from the transformer 150 overcomes the positive signal from the selecting network 105, the motor 33 will be driven in a direction to cause the opening of the eyelids 23 and 24. As soon as the acceleration relay 56 has become deenergized upon the actual engine speed reaching the selected speed, the electrical signal arising in the transformer 150 will be cut out of the temperature control portion of the apparatus as it affects the eyelids 23 and 24 and only the signals arising from the selecting network 105 will be operating through the summing resistor 115 into the input of amplifier 36.

Should the power lever 30 be moved from a high power position to a low position at a rate greater than the speed of the engine 10 or the indicator 88 can follow, it is also desired that the apparatus be switched over to a different mode of operation from that used during a normal or steady state mode of operation. When the power lever 30 is moved in the direction last assumed there will be arising from the speed selecting network 41 a predominately negative signal and this negative signal will be fed into input of amplifier 55. Inasmuch as initially the electrical signal from the speed indicating network 42 will not have changed, this negative signal on the input of amplifier 55 will be predominant and the phasing will be such as to cause operation of deceleration relay 67.

When this relay becomes energized the switch blades, 69, 70, and 71 will move into engagement with their associated contacts 75, 76 and 77. When the switch blade 69 engages contact 75 the temperature indicating network 107 will be effectively connected to the input of amplifier 35 through the conductors 170 and 171, switch contact 75, switch blade 69, and summing resistor 91.

When the switch blade 70 engages contact 76, and moves out of engagement with contact 73, the speed selecting signal from network 41 is no longer fed into the input of amplifier 35 and the minimum blowout temperature calibrator is substituted therefore. This calibration potentiometer 157 is so adjusted that it will select an engine operating temperature which will prevent the blowing out of a flame in chambers 14. It will be obvious that with the above assumed polarities on the network 155, with the left-hand terminal negative and the right-hand terminal positive, the electrical signal appearing upon the slider of the blowout calibration potentiometer 157 will be negative when measured with respect to the grounded center tap of the transformer 156. This negative signal, when fed into the input of amplifier 35, will be effective to cause the motor 32 to be driven in a fuel decreasing direction. As the fuel begins to decrease there will be a resultant decrease in the temperature of the engine and this will be detected by the thermocouple 129 which will be effective, when acting through the modulator and amplifier 128, to cause motor 127 to reposition the slider of potentiometer 126 in a more positive direction. As soon as the positive signal from the network 107 balances out the negative signal arising from the calibration potentiometer 157, there will be no effective signal on the input of amplifier 35 and there will be no further reduction in the fuel flow. This arrangement will always insure that there is sufficient fuel flowing into the combustion chamber to maintain a flame therein.

When the switch blade 71 engages contact 77 the electrical signal appearing upon the transformer 150 will again be added in series with the signal from the temperature selecting network 105 and the phasing of this signal from the transformer 150 as it appeared upon the winding 152 will be such as to tend to cause a closing of the eyelids 23 and 24. This closing movement is desired inasmuch as it is desired to decrease the speed of the turbine and the closing of the eyelids will cause a decrease in pressure drop across the turbine so that the turbine will tends to decrease in speed. In this case when the deceleration relay 67 is energized the temperature selecting signal from the network 105 will be fed through the winding 152, contact 77, switch blade 71, and summing resistor 115 into the input of amplifier 36. If the signal arising from the transformer 150 is equal to or greater than the signal from the temperature selecting network 105 the signal appearing on the input of amplifier 36 will be such as to cause closing of the eyelids 23 and 24. As soon as the indicated speed has reached the value of the selected speed the amplifier 55 will deenergize relay 67 and the apparatus will be in the position shown upon the drawing and will be operating in normal steady state mode of operation.

Figure 2

Referring now to Figure 2, there is shown the fuel regulator 18 with the diagrammatic relation of the various components being shown therein. Fuel for the regulator 18 passes through an intake conduit 200 to the intakes of three constant displacement fuel pumps 201, 202 and 203. The output of the pump 201 passes through a check valve 204 into a conduit 205 leading to the nozzles 15 of the main burner. Positioned downstream of the pump 201 is a cut off valve 206 which comprises a piston 207 which normally, when the pump 201 is operating properly, compresses a spring 208 to maintain open a fuel flow passage through the valve. The pump 202 is arranged to supply fuel through the check valve 204 to conduit 205 or through the cut off valve 206, check valve 209 to the conduit 210 leading to the afterburner nozzles 16. The pump 203 is arranged to pump fuel through the check valve 209 to the conduit 210. The driving energy for the pumps 201, 202 and 203 may be derived in any suitable manner such as, for example, from a driving pad on the engine 10, as represented by gearing 89, and coupling the same through suitable gearing 211 to the regulator 18.

The main burner fuel flow channel, commencing with the input conduit 205 includes a bypass pressure responsive regulator 215, a three-function flow control valve 216, and a cut off valve 217. The bypass regulator comprises a piston 218 which is slidable axially within a housing 219. The housing 219 has an inlet opening 220 and an outlet 223, the latter of which is normally in alignment with an angular groove 224 extending around the piston 218. A spring biased diaphragm 225 is used as an actuator for positioning the piston 218, the right-hand side of the diaphragm 225 being exposed to the fuel pressure downstream of the control valve 216 and the left-hand side of the diaphragm 225 being exposed to the fuel pressure immediately upstream of the flow control valve 216. Positioned within the piston 218 is a spring biased ball type pressure relief valve which, when the ball is unseated, will allow fuel to pass through the central portion of the piston 218 through an opening 226, the angular groove 224, to the outlet 223. A manually operated bypass valve 221 is in parallel with this last relief valve and is opened whenever the power lever 30 is in a cut off position.

The flow control valve 216 comprises a casing 230 in the form of a hollow cylinder with the central portion thereof expanded to form an annular passage around the entire cylinder. The ends of the cylinder are arranged to receive fuel from the intake conduit 205. Positioned immediately inside the cylinder 230 is a hollow piston 234 which has openings 233 in the upper end thereof. A further window or opening is cut in the side of this piston at 232 and this opening may assume any desired shape. Positioned within the piston 234 is a further hollow piston 235 having openings in the end thereof at 236 and a further window or opening 237 of any desired shape which is arranged to cooperate with the window 232 of the piston 234. The openings 232 and 237 provide an outlet for the passage of fuel from the inner portion of the piston 235 to the outlet chamber 231.

The piston 234 is arranged for axial movement within the cylinder 230 and will be rapidly moved in an upward direction by an overspeed governor 240 whenever the engine speed exceeds a predetermined value. This upward movement will have the effect of decreasing the opening between the windows 232 and 237 and therefore decreasing fuel flow whenever an overspeed condition occurs.

The piston 235 is arranged for axial movement inside of the piston 234 and this axial movement may be caused by the circular rack 242 which is driven by gear 243. The driving of the gear 243 may be accomplished by the motor 32, as shown in Figure 1, which connects to a clutch 245, the latter of which drives a serrated member 249 of the clutch 245. The clutch 245 also comprises an electromagnetic operator 247 which is arranged to couple either the manually operated serrated member 248 or the motor driven serrated member 249 by means of a driving member 250 to the gear 243. The members 248, 249, and 250 are mounted on a common shaft 251 which is splined in its center section to engage 250 and which floatingly carries 249 and 248 on either end, the shaft 251 connecting to gear 243. The electro-magnetic operator 247 is arranged to couple the clutching member 250 to the motor driven member 249 whenever the coil thereof is energized and the entire electrical system of Figure 1, is energized by a common switch means not shown.

The piston 235, in addition to being axially movable within the piston 234 is also arranged to be rotatably moved within the piston 234. The rotative movement is imparted to the piston 235 by the pressure responsive device or mass air flow compensator 257. This pressure responsive device comprises a pair of bellows 258 and 259, the former being an evacuated spring loaded bellows, the latter being exposed on the inner surface thereof to an engine operating pressure which may be compressor discharge pressure by means of a conduit 260. The expansion and contraction of the bellows is arranged to impart rotative movement to a gear 261 which is rigidly fastened to the shaft 262 so that rotation of the shaft 262 will cause rotative movement of the piston 235 within the piston 234.

The cut off valve 217 is arranged to be operated by the cam 252 which is rotated by the manual operator whenever the power lever is moved from a stop position. When the power lever is moved from the stop position, the cam 252 will unseat the valve member 253 and move the same to its wide open position so that there will be no impeding of the flow of fuel through the valve 217.

Referring now to the after burner fuel flow channel, commencing with conduit 210 and terminating at nozzle 16 there is provided for controlling the fuel flow therein a fuel bypass regulator 254 which is of the same construction as bypass regulator 215 associated with the main burner fuel flow channel. For regulating the fuel flowing to the afterburner fuel flow channel there is provided a flow control valve 264. The construction of this flow control valve is similar to that of flow control valve 216 in the main burner channel. The control valve 264 comprises an outer cylindrical housing 265 having an annular chamber extending around the central portion thereof and connecting with a down stream conduit 267. Immediately inside the housing 265 is a hollow piston 268 having openings 269 in the end thereof and a window type opening 270 in the side thereof. Positioned inside the piston 268 is a further piston 271 having openings 272 in the end thereof and a window 273 in the side thereof arranged to cooperate with the window 270 of piston 268. An adjustment 274, in the form of a lead screw is provided for axially moving the piston 271 inside of the piston 268. The piston 268 is arranged to be rotatably moved by the pressure responsive regulator 257 acting to rotatably move the shaft 262, piston 268 being splined on shaft 262 at 263. Axial movement is imparted to the piston 268 by means of the manual operator 275. The operator 275 is arranged to slidably move a shoulder 276 attached to the piston along the splines carried by the shaft 262 at 263. The shoulder 276 and therefore the piston 268 is biased into the position shown by means of a spring 277, the latter spring serves as an antibacklash device.

Positioned downstream of the flow control valve 264 and between the conduit 267 and the nozzle 16 is a cut off valve 280. This cut off valve 280 comprises a cam operator 281 which operates upon a cam follower surface 282 which is spring biased against the cam 281 and normally biases the valve seat 283 in a closed position. Sufficient rotative movement of the cam 281 will depress the follower and the valve seat 283 to move the valve to wide open position so that fuel may flow from the conduit 267 to the nozzle 16 through conduit 284.

For igniting the fuel flowing to the afterburner nozzle 16, an injector nozzle 17 is provided. This injector nozzle 17, referring to Figure 1, is placed upstream of the turbine 11 and is arranged to project a stream of fuel through the turbine 11 so that the flame in the combustion chamber 14 is carried through the turbine to the afterburner nozzle 16. Referring back to Figure 2, the ejecting of fuel from the nozzle 17 is accomplished by an injector 286. This injector comprises a cylindrical housing 287 having an inlet port at 288 from conduit 289 and an outlet port at 290 in the end of housing 287. A piston 291 is slidably positioned within the housing 287 and normally biased by means of a spring 292 against the left hand end of the housing 287. When the cutoff valve 280 in the afterburner fuel flow channel is open, the fuel pressure in conduit 284 will pass through conduit 294 and will build up a pressure on the left end of the piston 291 and will force the same to the right compressing the spring 292. This movement of the piston 291 will force fuel stored within the housing 287 through the outlet 290 and past a check valve 293 to the injector nozzle 17. Fuel is prevented from flowing out of the inlet 288 and the housing 287 by a two position cut off valve 295. This cut off valve comprises a piston 296 positioned within the housing 297 and, normally, the fuel pressure in conduit 267 connected to the housing 297 operates upon the upper surface of the piston 296 and forces the same to compress a biasing spring 298. The piston 296 is connected by means of a valve stem 299 to a pair of valve members 300 and 301. When the piston 296 is in the downward position, the valve member 300 is forced against a valve seat 302. When the cut off valve 280 in the afterburner channel is open, the fuel pressure on the downstream side of the cut off valve 280 will pass through conduit 294, a dual-rate check valve 303 and conduit 304 to the lower side of piston 296 and this pressure acting with spring 298 will force the piston 296 in an upward direction so that the valve member 300 will be unseated from the seat 302 and the valve member 301 will be moved into position on the seat 302.

The dual-rate check valve 303 comprises a perforated diaphragm 305 which carries a ported member 306 having a port 307 in the center thereof. When the cut off valve 280 is open and fuel starts flowing from the downstream side of the cutoff valve through conduit 294 and through the check valve 303, the member 306 unseats itself in the right end of the housing 308 and the fuel passes through the port 307 as well as around the outside of the member 306 through the perforate diaphragm 305. This will allow the fuel from conduit 294 to reach the piston 296 of the two position cutoff valve 295 relatively quickly. When the cutoff valve 280 in the afterburner channel is closed, the pressure on the upstream side of the cutoff valve 280 will increase and will force the piston 296 downward. The fuel on the lower side of the piston 296 must pass through the check valve 303 and this forces the ported member 306 to seat itself against the right end of the housing 308. When the member is so seated, the fuel on the lower side of piston 296 must pass through the port 307 which is a very small restriction compared to the restriction of the fuel flowing in the opposite direction to the valve 303. This restriction impedes the flow of fuel from the lower side of the piston 296 and therefore the piston 296 will be forced in a downward direction relatively slowly compared to its movement in the upward direction.

The manually operated bypass valve 310 is arranged to be opened by the main power lever whenever the afterburner channel is not used and the cutoff valve 280 is closed. This bypass valve will bypass fuel from the conduit 219 through the return conduits 311 and 312. This bypassing serves to eliminate some of the excessive heating caused forcing fuel to be bypassed by the regulator 254 when the afterburner channel is not in operation and while the fuel is being supplied thereto by the pumps 202 and 203.

The power lever 30, shown in Figure 1, is arranged to be coupled to the manually positioned linkage 315 within the regulator 18. This linkage 315 comprises a driving link 316 which is directly coupled to a driving arm 317 pivoted at 318. A torsion spring 319 is connected to a further member 320, said spring forcing the member 320 against the driving member 317 so that a pin 321 carried by the member 320 engages the member 317. The member 320 will follow the member 317 in a counter-clockwise movement because of the spring 319 until such time as the member 320 strikes a stop at 322. The member 317 is arranged to rotatively drive a shaft 323 through a lost motion linkage 324 which may comprise a sloted member 325 cooperating with a pin carrying lever 326 which is arranged to drive the shaft 323. The rotative movement of the shaft 323 will be effective only when the power lever has been moved near an end position where maximum power is desired and afterburner operation is desired. When the power lever is not in this advanced position, a biasing spring 328 operates upon a pivoted lever 329 to bias the same against a stop 330. When the member 329 is resting against the stop 330 due to the biasing action of the spring 328, manual operator 275 and the bypass valve 310 will be in the position in which they are shown upon the drawing.

*Operation of Figure 2*

The apparatus as shown in Figure 2 is assumed to be in a completely deenergized and cutoff position. When in this position, the electrical system will be deenergized and the solenoid clutch 247 will be deenergized so that the clutching member 250 will be engaging the manually drive member 248. Further, the cutoff valves 217 and 218 in the main burner fuel flow channel and the afterburner fuel flow channel respectively, will be closed.

Assume next that the electrical system is energized and that the power lever 30 is moved from the cutoff position. When the entire electrical system is energized, the solenoid clutch 247 will become energized and will shift the coupling member 250 from the manual member 248 into clutching engagement with the member 249 so that the control motor 32, shown in Figure 1, will be operatively connected with the bearing 243. When the power lever is moved away from the cutoff position, the driving member 316 will be moved toward the left and the lever 320 will folow this movement. The movement of the lever 320 will be a counter-clockwise direction and be effective, through cam 252, to open the cutoff valve 217 in the main fuel burner channel. This movement is commenced as soon as the starters for the engine 10 are energized, said starters not being shown, and the turbine 11 and shaft 13 are brought up to the predetermined speed. The rotative movement of the turbine 11 will be imparted to the pumps 201, 202 and 203. These pumps will commence to supply fuel to the fuel regulator 18 and the flow from the pump 201 may be traced from the inlet conduit 200, through pump 201, check valve 204, conduit 205, flow control valve 216, conduit 332, cutoff valve 217, and conduit 333 to the burner nozzle 15. As soon as the fuel supplied to the nozzle 15 has been properly ignited, the engine will operate under its own power and the pumps 201, 202, and 203 will receive their driving energy from the gases expanding through the turbine 11.

Assuming that the power lever is not advanced into the range wherein it is desired to operate the afterburner, the cutoff valve 280 in the afterburner fuel flow channel will be closed hence there will be no fuel flowing to the afterburner nozzle 16. Inasmuch as the pump 203 is operating, fuel will be supplied from the pump through check valve 209, and conduit 210 to the upstream side of the fuel regulator 264. This fuel will be bypassed by the manually operated valve 310 to the conduits 311 and return conduit 312. Bypassing will also occur, if the manual valve does not have sufficient capacity, via the ball type pressure relief valve located within the pressure regulating valve 254 and via the annular groove in the piston of the regulator.

The fuel control valve 216 in the main burner fuel control channel will operate to regulate the fuel flowing to the nozzles 15. When the electrical system is enaged with the gear 246 driving the member 249 and therefore the clutch member 250 and bear 243, axial movement will be imparted to the rod 262 by the gear 243 operating on circular rack 242. Under normal operating conditions, when the motor 32 is being controlled by variations in engine speed, the motor 32 will be effective, upon the occurrence of an increase in engine speed, to drive the gear 243 in a counter-clockwise direction so that the rack 242 will move downwardly. The downward movement of the rack 242 will cause the piston 235 to move downward and to restrict or cut down the amount of overlap between the windows 232 of piston 234 and window 237 of piston 235. This cutting down of the overlap between the two windows or openings will decrease the amount of fuel flowing and this decreased fuel flow will cause a decrease in the engine speed by cutting down the amount of gases which will be available for expanding through the turbine 11 of the engine 10. Should the engine speed be too low, as indicated by the electrical apparatus in Figure 1, motor 32 will be effective to drive the gear 243 in a clockwise direction so that the circular rack 242 will move upwardly to increased the amount of overlap between the windows 232 and 237 to so there will be an increased fuel flow.

In the event that the speed of the turbine 11 should go to a value higher than that at which the engine can be safely operated, it is desired that the fuel flow be decreased. This is accomplished by the overspeed governor 240. The overspeed governor 240 will be effective to move the outer piston 234 in an upward direction so as to decrease the amount of overlap between the windows 232 and 237. This decrease in the overlap will tend to decrease the amount of fuel flowing to the nozzles 15 and therefore the speed of the engine will be decreased. As soon as the overspeed condition has been relieved, the outer piston 234 will reassume its normal operating position.

There will also be an adjustment made of the inner piston 235 by changes of compressor discharge pressure, said pressure being sensed by the pressure regulator 257 receiving its operating pressure from the engine 10 by means of conduit 260. The changes in the compressor discharge pressure will cause rotative movement of the gear 261 and therefore the shaft 262 which is directly attached to the inner piston 235. This rotative movement, due to a change in compressor discharge pressure, will be in a direction to call for a compensating change in fuel flowing to the nozzles 15. As long as the automatic electric control of Figure 1 is in operation, the adjustments made by the pressure regulator 257 will have no ultimate effect upon the amount of fuel flowing in the control. Should the pressure regulator 257 indicate that more fuel should flow to the engine in order to match the amount of air available, there will be an opening in the fuel control valve 216. If this opening causes an increase in the turbine speed over that desired or selected by the power lever 30, in the electrical network, the motor 32 will be effective through the gear 243 and rack 242 to cause the fuel flow to go to the desired value so that the desired speed will be maintained. Thus, the motor 32 will have the effect of overriding the pressure controller 257, that is, while the apparatus is being automatically controlled.

Inasmuch as the pumps 201 and 202 supplying fuel to the main burner channel are constant displacement pumps, it is necessary to bypass fuel which is not fed directly to the nozzles 15. This bypassing is accomplished by the regulator 215. As previously set forth, the right-hand side of the diaphragm operator 225 of the regulator 215 is exposed to pressure downstream of the fuel regulator valve 216 while the left-hand side of the diaphragm operator 225 is exposed to the pressure upstream of the regulator valve 216. When the pressure differential across the fuel regulator valve 216 increases above a preselected value, the operator 225 will move toward the right and cause the piston 218 to be moved to the right so that the angular groove 224 on the surface thereof will be brought into alignment with the opening in the casing 219 so that fuel will be bypassed from the opening 220, through the annular groove 224, and out through the opening 223 to the bypass return conduits 311 and 312. In the event of engine shut down when the shutoff valve 253 is closed should the pressure on the upstream side of the fuel regulator become too great, the ball type pressure relief valve will unseat itself and will allow fuel to pass from the conduit 205 through the inner portion of the piston 218, through opening 226, to annular groove 224 and thence to the outlet 223. Further, when the power lever 30 is moved to a cutoff position, the bypass valve 221 will be opened to relieve the pressure on the regulator and prevent overheating of the fuel.

When the power lever 30 is moved into the high power position wherein it is desired that the afterburner be operative, the manual control linkage 324 will be effective to rotate the member 317 in a counterclockwise direction. The movement of lever 317 in the counterclockwise direction will result in the lever 320 following due to the action of the torsion spring 319. This following movement will continue until such time as the lever 320 strikes the stop 322. Continued movement of the lever 317 is possible and, as soon as the lost motion is taken up in the linkage 324, the shaft 323 will begin to rotate. The rotation of the shaft 323 will indicate that the afterburner range of operation has been reached.

As soon as the lost motion is taken up and the shaft 323 rotates, the lever 329 carried by the shaft 323 will rotate in a counterclockwise direction and will close the bypass valve 310. The cam 281 will be effective, when sufficiently rotated to open the cutoff valve 280 so that fuel will pass through the conduit 267 to the cutoff valve and conduit 284 to the afterburner nozzles 16. As soon as the fuel pressure in the downstream side of the cutoff valve 280 builds up, the fuel pressure will act upon the head of piston 291 in the injector assembly 286. Inasmuch as the chamber within the housing 287 is filled with fuel, the movement of the piston toward the right will force the fuel therein through the outlet 290, past the check valve 293, to the injector nozzle 17. When the fuel pressure was building up in the conduit 294, fuel will pass through the dual-rate check valve 303 to the lower side of piston 296. The building up of the pressure on the lower side of the piston 296 cooperates with the spring 298 to raise the piston in an upward direction. This upward movement will unseat the valve member 300 and seat the member 301. This movement will be relatively quick due to the fact that there will be effectively no restriction to the flow of fuel to the lower side of piston 296 in the check valve 303. When the valve member 301 seats in the valve seat 302 there can be no fuel flowing from the injector 286 through the inlet 288 back to the return conduit 312. The flowing of fuel through the injector nozzle 17 will cause a stream of fuel in the form of droplets to pass through the turbine 11 and will carry the flame from the combustion chambers 14 so that the fuel flowing from the nozzle 16 will be ignited.

Continued movement of the lever 317 will cause a counterclockwise movement of the manual actuator 275 on the fuel flow control valve 264. This counterclockwise movement of the lever 275 will cause the depressing of the shoulder 276 and the piston 268 will be moved in a downward direction. This downward movement of the piston 268 will cause the windows 270 and 273 to have a larger overlap so that there will be more fuel flowing to the afterburner nozzles 16 through the regulator valve 264. It is thus seen that there is a manual adjustment available for regulating the amount of fuel flowing to the afterburner nozzles 16, the amount of the fuel flow being dependent upon the position of the power lever when in the afterburner range of adjustment.

Rotative movement is also imparted to the piston 268 by means of the pressure responsive regulator 257. The expansion and contraction of the bellows 259 when responding to changes in the compressor discharge pressure will cause rotative movement of the shaft 262 and this rotative movement is transferred through the splining 263 and the shoulder 276 to the piston 268 so that the openings between the windows 273 and 270 will be variably adjusted in accordance with compressor discharge pressure. This pressure regulator will insure that when the apparatus is operating in the afterburner range of operation, the fuel flowing to the main burner nozzles 15 and the afterburner nozzles 16 will not reach the amount of fuel which will cause destruction of the engine. In other words, the pressure regulator 257, in effect, gives an indication of the amount of air available on the compressor discharge portion of the apparatus and meters the fuel to the engine to insure that the air supply is adequate for the amount of fuel being consumed. If this pressure measurement were not available, the control would have to be designed to be restricted in the amount of fuel flowing in order to insure that under no condition could the amount of air and fuel reach a combination which would cause destruction of the engine. With the pressure regulator available, it is possible to operate closer to the limiting factors of the engine without causing destruction under adverse operating conditions. While the adjustment of the pressure regulator 257 will have no appreciable effect upon fuel control valve 216, due to the overriding effects of the electrical control network, there will be a definite effect upon the afterburner flow valve 264.

Assuming the afterburner operation is no longer desired, the power lever is moved out of the afterburner range of operation and this movement will cause a clockwise movement of the shaft 323 so that the cam 281 will allow the closing of the valve member 283 and the cutoff valve 280 to stop the flow of fuel to the afterburner nozzles 16. At the same time, the bypass valve 310 will be opened to bypass fuel from the conduit 210 to the return conduit 311. When the cutoff valve 280 is closed, this will relieve the pressure on the downstream side of the cutoff valve in conduit 284 and therefore the piston 291 in the injector 286 will be allowed to move back toward the left, said movement being induced by the biasing spring 292. At the same time, the decrease in pressure on the downstream side of the cutoff valve 280 will relieve the pressure on the lower side of the piston 296 of cutoff actuator 295. The release of this pressure and the building up of the pressure on the upstream side of the valve 280 in conduit 267 will cause the piston 296 to move downward. Because of the check valve 303, the movement of the piston 296 in a downward direction will be impeded because the only passage for the fuel on the lower side of the piston 296 will be through the orifice 307. While the piston 296 is moving downwardly both the valve members 301 and 300 will be unseated and it will be possible for fuel in the return conduit 312 to be drawn in through the valve 295 and the inlet 288 of the injector 286 so that the injector will fill the chamber within the housing 287 in preparation for supplying a further injection of fuel for igniting the afterburner flame. As soon as the fuel on the lower side of the piston 296 has passed through the orifice 307 of the check valve 303, the piston will be in a downward position wherein the valve member 300 will be engaging the valve seat 302 and will prevent any further fuel from flowing into the injector.

If a further operation in the afterburner range of operation is desired, the power lever will again be advanced into the afterburner range of operation and the apparatus will go through the operation explained above.

If for any reason the electrical control system of Figure 1 should fail or the same be cut off by the pilot, the solenoid 247 will become deenergized and the clutch member 250 will move into engagement with the manually adjusted lever 248. This clutching movement will have the effect of coupling the power lever 30 through the driving member 316, lever 317, lever 320, lever 335, shaft 336, member 248, clutching member 250, and gear 243, to the circular rack 242 carried by the actuator rod 262. Movement of the power lever will then effect movement of the inner piston 235 of the flow control valve 216. The rotative movement of the gear 243 will have the same effect upon the piston 235 as did the rotative movement imparted thereto by the control motor 32. When in the manual mode of operation, the adjustments made in the flow control valve 216 due to the pressure regulator 257 will be effective and will tend to match the amount of fuel flowing in the main burner channel with the amount of air available without there being any danger of the resultant combustion temperature exceeding a predetermined safe value. The overspeed governor 240 will function as a speed limiting device as it did when the apparatus was operating with the automatic control.

When the power lever is moved into the afterburner range of operation, the afterburner will come into operation as explained above under the automatic mode of operation. The only difference in the operation under the assumed circumstances is that both the fuel flow valves 216 and 264 will be manually controlled and limited in accordance with the adjustments made by the pressure regulator 257.

The dual functioning of the pressure regulating device 257 on both the regulating valves 216 and 264 is particularly important when operation of the apparatus is being done by manual adjustment through the levers 315. The synchronous adjustment of the fuel flow in both the main and afterburner channels is particularly important when it is realized that most jet engines operate with a surplus supply of air. The effect of adding more fuel without an increase in the air supply is to cause the temperature of the engine to increase and possibly overheat. The pressure regulator, in simultaneously adjusting both valves 216 and 264, maintains the ratio of fuel to air flow within values consistent with the amount of air available. By using a single controller for both valves, there is a minimum of adjustment required in calibrating the regulator and the regulator will act equally upon both valves. This will tend to eliminate errors in the coordinating of the fuel flows in the two channels.

In the event that the pump 201 should fail for any reason and not deliver fuel to the conduit 205, it is desired that the pump 202 be used to supply fuel to only the channel 205. This is accomplished by means of a cutoff valve 206 which has piston 207 thereof exposed to fuel pressure on the downstream side of the pump 201. This piston 207 is normally forced to the left to compress a spring 208 and when so positioned will allow fuel to pass through the valve 206. When the pressure on the downstream side of the pump 201 drops below a predetermined value, the piston 207 will be forced to the right and the passageway through the valve will be closed. This will cutoff the flow of any fuel from the pump 202 down to the check valve 209 and conduit 210 of the afterburner channel so that all of the output from the pump 202 will be utilized in the main burner channel commencing with check valve 204 and conduit 205. The arrangement of having three pumps supply fuel to the two fuel control channels tends to lengthen the life of all of the pumps.

From the foregoing it will be seen that there has been provided a new and improved fuel controller for fuel flowing to the combustion chambers of a jet engine with a regulator for coordinating the adjustment of the flow control valves in each of the fuel flow channels to the combustion chambers. Further, this controller includes a new afterburner igniter assembly which operates automatically upon the initiating of fuel flow to one of the combustion chambers. Still further there is included a pump arrangement wherein three pumps are provided for supplying fuel to two control channels and wherein one of said pumps fails the other two are utilized in supplying fuel to the channels. It will be obvious to those skilled in the art that many modifications can be made within the teachings of the present specification and without departing from the concept thereof. Therefore, I intend to be limited solely by the scope of the appended claims in which I claim:

1. A fuel controller for a combustion engine having a main and afterburning chamber, comprising in combination, a pair of fluid flow passages, one of said passages flowing to the main chamber and the other flowing to the afterburning chamber, a pair of throttling valves positioned in said passages, a first controller responsive to an engine operating variable, a second controller responsive to a second engine operating variable, means connecting said first controller to simultaneously adjust both of said valves, means connecting said second controller to adjust only one of said valves, fuel injector means, and means downstream of said other flow passage for causing operation of said fuel injector means.

2. In a fuel controller for a combustion engine having a main combustion chamber and an afterburning chamber, the combination comprising, a pair of fluid flow passages, one of said passages flowing to the main chamber and the other flowing to the afterburning chamber, a pair of throttling valves positioned in said passages, a first controller responsive to an engine operating variable, a second controller responsive to a second engine operating variable, a third controller responsive to a third engine operating variable, means connecting said first controller to simultaneously adjust both of said valves, means connecting said second and third controllers to adjust only one of said valves, fuel injector means for igniting the after burner, and means for operating said injector means when fuel is flowing in both of said passages.

3. In a fuel controller for a combustion engine, a fuel igniter assembly comprising, a first fuel flow channel, a control valve in said first passage, an injector having an inlet and an outlet, a second fuel flow passage with said injector positioned therein, a cutoff valve in said second passage positioned upstream of said injector to control the flow of fuel through said inlet, means responsive to the fuel flow downstream of said control valve for closing said cutoff valve, and means within said injector responsive to fuel flow downstream of said control valve for forcing fuel to flow through the outlet of said injector.

4. In a fuel controller for a combustion engine, a fuel igniter assembly comprising, a first fuel flow passage, a control valve in said first passage, a fuel injector having an inlet and an outlet and a spring loaded piston therein, a second fuel flow passage having said fuel injector positioned therein, a cutoff valve positioned in said second passage upstream of said injector to control the flow of fuel through said inlet, means for connecting said piston of said injector to respond to the fuel flow downstream of said control valve so that said piston will move against the biasing action of the spring loading the same, said piston forcing fuel through said outlet, a controller for said cutoff valve in said second passage, said controller responding to the fuel pressure downstream of said control valve and effective on the presence thereof to close said cutoff valve and prevent flow of fuel through said inlet, and means opening said cutoff valve upon the closing of said control valve.

5. In a fuel controller for a combustion engine, a fuel igniter assembly comprising, a fuel flow passage, a fuel injector having an inlet and an outlet positioned in said passage, a cutoff valve upstream of said inlet, a check valve downstream of said outlet, said injector comprising a piston normally forced to one position by a spring and when moving to said position drawing fuel into said injector through said inlet, means for opening said cutoff valve while said piston is filling said injector, and pressure responsive means for closing said cutoff valve.

6. A fuel igniter assembly for a combustion engine comprising, a first fuel flow passage, a control valve positioned therein, a second fuel flow passage, a fuel injector having an inlet and an outlet positioned therein, a cutoff valve positioned upstream of said inlet in said second passage, a spring loaded pressure responsive operator for controlling said cutoff valve, and means connecting said operator to respond to the fuel pressure upstream of said control valve and downstream of said control valve, said operator upon the closing of said control valve causing a momentary opening of said cutoff valve.

7. A fuel igniter assembly for a combustion engine comprising, a first fuel flow passage, a control valve positioned in said passage, a second fuel flow passage, a cutoff valve in said second passage, a spring biased operator for controlling said cutoff valve, said operator comprising a member movable in accordance with control pressures applied thereto, means connecting one side of said operator to be exposed to the fuel flow upstream of said control valve in said first passage, means connecting the other side of said operator to the downstream side of said control valve in said first passage, said operator assuming a first position when said control valve is open and a second position when said control valve is closed and when moving between said positions causing the opening of said cutoff valve in said second passage, and a dual rate flow orifice positioned in said connecting means to the downstream side of said control valve.

8. A fuel igniter assembly for a combustion engine comprising, a first fuel flow passage, a control valve positioned in said passage, a second fuel flow passage, a cutoff valve in said second passage, a spring biased operator for controlling said cutoff valve, said operator comprising a member movable in accordance with control pressures applied thereto, means connecting one side of said operator to be exposed to the fuel flow upstream of said control valve in said first passage, means connecting the other side of said operator to the downstream side of said control valve in said first passage, said operator assuming a first position when said control valve is open and a second position when said control valve is closed and when moving between said positions causing the opening of said cutoff valve in said second passage, and a dual rate flow controller positioned in said connecting means to the downstream side of said control valve, said flow controller capacity being a minimum when the flow is from said downstream side to said operator and being a maximum when the flow is from said operator to said downstream side so that said cutoff valve will be maintained open for a greater length of time when the flow through said flow controller capacity is from said operator to said downstream side.

9. In a fuel flow controller for a combustion engine, the combination comprising, a pair of fuel flow passages, a pair of constant displacement fuel pumps supplying fuel to said pair of passages, a flow control valve in one of said pair of passages, a further control valve in the other of said passages, manually operated means for adjusting said flow control valves, pressure responsive means responsive to the pressure drops across said control valves for opening a bypass passage upon the pressure drops exceeding a predetermined value, and means controlled by said manual means for opening said bypass when said manual means is positioned in a predetermined position.

10. A fuel control system for a combustion engine, comprising in combination, first and second fuel flow passages, a pair of constant displacement pumps arranged to supply fuel to each of said passages, a third constant displacement pump arranged to supply fuel to both of said passages, said third pump being arranged to supply fuel to only one of said passages upon the failure of the pump normally supplying fuel thereto, first and second throttling valves connected in said first and second passages respectively, said first and second throttling valves having a common operator which positions said valves in accordance with changes in an engine operating variable, a cutoff valve in one of said passages, said cutoff valve having a manual operator, a fuel injector, and means responsive to the fuel pressure downstream of said cutoff valve when said cutoff valve is opened for causing operation of said fuel injector.

11. In a fuel controller for a combustion engine, the combination comprising, first and second fuel flow passages, a fuel pump positioned in each of said passages to supply fuel thereto, a further pump for supplying fuel to both of said passages when the pump in each of said passages is operating properly, means responsive to improper operation of one of said pumps for causing said further pump to supply fuel to only one of said passages, first and second fuel flow control valves positioned in said first and second passages respectively, a controller responding to an engine operating variable, and means connecting said controller to simultaneously adjust both of said valves.

12. In a fuel controller for a combustion engine, the combination comprising, first and second fuel flow passages, a flow control valve in each of said passages, and manual means for adjusting said control valves, said manual means comprising a first member directly positioned by a manual operator, a second member resiliently biased into operating relation with said first member, a lost motion driving connection between said first member and one of said valves, and a direct connection between said second member and the other of said valves.

13. In a fuel controller for a combustion engine, the combination comprising, a first valving apparatus comprising, a hollow ported cylindrical housing having a pair of ported pistons relatively movable with respect to each other and said housing, a second valving apparatus comprising a second hollow ported cylindrical housing having a pair of ported pistons relatively movable with respect to each other and said second housing, a first stem for adjusting one of said pistons in said first apparatus, a second stem for adjusting in two senses the other of said pistons of said first apparatus, means yieldably connecting said second stem to one of said pistons in said second apparatus so that movement of said second stem in one of said senses will impart movement to said last named one piston and movement in the other of said senses will not effect movement of said last named one piston, a first condition responsive means connected to adjust said first stem, and a pair of further condition responsive means for adjusting said second stem in said two senses.

14. In a fuel controller for a combustion engine, the combination comprising, first and second flow control valves, an actuating member operatively connecting said valves so that movement of said member in a first sense will cause movement of both of said valves and movement in a second sense will cause movement of only said first valve, a first controller connected to said member to adjust said member in said first sense, a second controller connected to adjust said member in said second sense, means for restricting the movement of said second controller to a first range, manual means for adjusting said second controller and connected to said second valve to adjust said second valve in a sense corresponding to said second sense in a range which extends beyond said first range.

15. In a fuel controller for a combustion engine, the combination comprising, a hollow cylindrical housing having a port in the side thereof, a first hollow piston movably mounted within said housing and having a port in the wall thereof adapted to be brought into alignment with the port in said housing, a second hollow piston movably mounted within said housing and having a port in the wall thereof adapted to cooperate with said ports of said housing and said first member, a first stem for moving said first piston relative to said housing and said second piston, a second stem for moving said second piston relative to said housing and said first piston, a second valving apparatus including a hollow cylindrical housing having a port in the side thereof and two pistons having ports in the sides thereof movably mounted in said second housing so that the said ports are cooperative with each other and with the port in said second housing, and means yieldably connecting said second stem to one of last named pistons to impart movement thereto when said stem is moved in one sense but not in another.

16. In a fuel controller for a combustion engine having a main combustion chamber and an after burning chamber, the combination comprising, a first flow passage for fuel flowing to the main combustion chamber, a first valving apparatus connected in said first flow passage, said apparatus comprising, a hollow ported cylinder housing having a pair of ported pistons relatively movable with respect to each other and said housing, a first controller responsive to an engine operating variable, a first stem for adjusting one of said pistons, means connecting said first stem to said first controller for rotatable movement of said piston, a second controller responsive to pressure, a second stem for adjusting the other of said pistons, means connecting said second stem to said second controller to provide for rotatable movement of said second piston, a third controller responsive to a manual movement of an engine power lever, and means connecting said third controller to said second stem to provide for axial movement of said piston, a second flow passage for fuel flowing to the after-burning chamber, a second valving apparatus connected in said second flow passage, said apparatus comprising, a hollow ported cylinder housing having a pair of ported pistons relatively movable with respect to each other and said housing, a fourth controller responsive to manual movement of said engine power lever, a third stem for adjusting one of said pistons of said second valving apparatus, means connecting said third stem to said fourth controller to provide for axial movement of said piston, and means connecting said third stem to said second controller to provide for rotatable movement of one of said pistons of said valving apparatus.

17. In a fuel controller for a combustion engine, a fuel igniter assembly comprising, first and second fuel flow passages, a control valve in said first passage, an injector having an inlet and an outlet for supplying fuel to said second fuel flow passage, said injector having means responsive to the fuel pressure downstream said control valve for effecting operation thereof so that said injector will force fuel to flow in said second passage, and valve means associated with the inlet of said injector, said valve means being responsive to the pressure downstream of said control valve for blocking the flow of fuel from said injector back into said inlet during an injection period and being responsive to the pressure upstream said control valve for blocking the flow of fuel from said inlet through said injector after said injector has been replenished.

References Cited in the file of this patent

UNITED STATES PATENTS

| | | |
|---|---|---|
| 89,399 | Gilbert | Apr. 27, 1869 |
| 991,950 | Carroll | May 9, 1911 |
| 1,541,712 | Horn | June 9, 1925 |
| 2,331,817 | Turchan et al. | Oct. 12, 1943 |
| 2,375,204 | Baker | May 8, 1945 |
| 2,422,808 | Stokes | June 24, 1947 |
| 2,440,371 | Holley | Apr. 27, 1948 |
| 2,489,586 | Ray | Nov. 29, 1949 |
| 2,506,611 | Neal et al. | May 9, 1950 |
| 2,520,967 | Schmitt | Sept. 5, 1950 |
| 2,552,231 | Streid et al. | May 8, 1951 |
| 2,566,373 | Redding | Sept. 4, 1951 |
| 2,570,591 | Price | Oct. 9, 1951 |
| 2,576,352 | Neal | Nov. 27, 1951 |
| 2,640,316 | Neal | June 2, 1953 |
| 2,670,033 | Ray | Feb. 23, 1954 |
| 2,674,847 | Davies et al. | Apr. 13, 1954 |

FOREIGN PATENTS

| | | |
|---|---|---|
| 963,819 | France | Jan. 18, 1950 |
| 464,891 | Great Britain | Apr. 27, 1937 |